US007389862B2

(12) United States Patent
Chen et al.

(10) Patent No.: US 7,389,862 B2
(45) Date of Patent: Jun. 24, 2008

(54) CONTINUOUSLY ADJUSTABLE ROTATION DEVICE

(76) Inventors: Chun-Lung Chen, 6F.-3, No. 33, Sec. 1, Minsheng Rd., Banciao City, Taipei County (TW); Yu-Sheng Chen, 6F.-3, No. 33, Sec. 1, Minsheng Rd., Banciao City, Taipei County (TW); Chien-Lin Chen, 6F.-3, No. 33, Sec. 1, Minsheng Rd., Banciao City, Taipei County (TW)

( * ) Notice: Subject to any disclaimer, the term of this patent is extended or adjusted under 35 U.S.C. 154(b) by 289 days.

(21) Appl. No.: 11/271,909

(22) Filed: Nov. 14, 2005

(65) Prior Publication Data

US 2007/0108008 A1 May 17, 2007

(51) Int. Cl.
*F16D 11/06* (2006.01)

(52) U.S. Cl. ................................ 192/43; 81/58; 81/63.1

(58) Field of Classification Search ................... 192/43, 192/43.1; 81/60, 58, 63.1
See application file for complete search history.

(56) References Cited

U.S. PATENT DOCUMENTS 4,520,697 A * 6/1985 Moetteli ........................ 81/62
5,609,078 A * 3/1997 Yang .......................... 81/63.1
6,101,901 A * 8/2000 Daigle ........................... 81/60
6,431,031 B1 * 8/2002 Hu ............................. 81/63.2
6,776,071 B1 * 8/2004 Chen ............................. 81/60
7,059,217 B2 * 6/2006 Horvath ..................... 81/57.39

FOREIGN PATENT DOCUMENTS

TW 527989 4/2003

OTHER PUBLICATIONS

European Search Report.

* cited by examiner

*Primary Examiner*—Richard M. Lorence
*Assistant Examiner*—Derek D Knight

(57) ABSTRACT

A continuously adjustable rotation device includes a base, a first connection element combined with the base, a ring buckle, a transmission disc, a second connection element, and a rotation controller. The transmission disc is formed on the contacting portion of the base, forming an inclination angle and contacting the second connection element for transmission of force. By using the rotation controller, one can select a rotation direction by properly contacting with the transmission disc. When the rotation direction is selected, the second connection element and the transmission disc then drive the first connection element to rotate in the designated direction. One can thus perform a continuously adjustable rotation. Therefore, no alignment is needed when assembling the rotation device, which will enhance the production yield and lower the manufacturing cost.

18 Claims, 14 Drawing Sheets

CONTINUOUSLY ADJUSTABLE ROTATION DEVICE

BACKGROUND OF THE INVENTION

The present invention relates generally to a continuously adjustable rotation device, and more particularly to a rotation device that is easy to assemble and can perform precise rotational movements, thereby improving the rotational alignment and lowering the manufacturing cost thereof. The continuously adjustable rotation device of the present invention is applicable to many products that require the performance of rotational motions.

Rotational mechanism is normally applied to products that perform single directional or double directional rotations. For example, the rotational mechanism is commonly seen in a ratchet wrench, a shaft for adjusting the illuminating angles of a lamp, a positioning shaft for adjusting the angle formed between a seat and a seat back, etc. Some conventional rotational mechanisms employ a ratchet wheel or a ratchet to incorporate with a positioning element. Other rotational mechanisms employ the incorporation between a concave portion and a protrusive point, or the incorporation between an elastic element and steel balls, so as to obtain a single directional or a double directional rotational operation and positioning. However, these rotational mechanisms are restricted to sectional positioning. In other words, only at certain rotational angles can the rotational mechanism be securely positioned. One can not continuously adjust the rotational motion and position the rotational mechanism at any desirable rotated angle.

One possible solution to the aforementioned drawbacks is disclosed in the Published Taiwanese New Utility Model Patent No. 527989, entitled “Continuously Adjustable Ratchet Wrench.” In this conventional art, the continuously adjustable ratchet wrench includes a slanted continuously adjustable disc base disposed at the bottom portion of a wrench body. The slanted frictional surface faces upward, which contacts a continuously adjustable rotational mechanism for transmission of force. The continuously adjustable rotational mechanism includes a spherical disc, a slanted continuously adjustable disc, and a combining shaft. The combining shaft is thrust into the spherical disc and the slanted continuously adjustable disc, and is combined with the slanted continuously adjustable disc base. Further, a C-shaped buckle and a pushing rod mechanism are employed to select the rotation direction and to control the rotation. When one rotates the combining shaft to an angle, the spherical disc, the slanted continuously adjustable disc and the slanted continuously adjustable disc base perform frictional rotational motion with the combining shaft along the contact surface. In addition, the pushing rod and the elastic element of pushing rod mechanism are pushed to move backward in response to the compression of the slanted continuously adjustable disc. Furthermore, the pushing rod of the pushing rod mechanism is pushed outward due to the elastic force from the elastic element after the combining shaft is rotated to a certain angle, thereby tightly pushing the slanted continuously adjustable disc to securely position the rotated angle.

However, the fabrication of the slanted continuously adjustable disc base and the slanted continuously adjustable rotational mechanism requires the use of high precision equipment and highly accurate alignment assembly process. Therefore, the yield of manufacturing is significantly lower than expected and the cost thereof is much higher. Moreover, the rotational operation can not guarantee that the slanted surfaces are properly contacted with each other.

BRIEF SUMMARY OF THE INVENTION

The present invention is to provide a continuously adjustable rotation device, which is structurally simple and easy to assemble, thereby enhancing the transmission efficiency without the need of a alignment process during fabrication.

In order to achieve the above and other objectives, the continuously adjustable rotation device includes a base, a first connection element combined with the base, a ring buckle, a transmission disc, a second connection element, and a rotation controller. The base includes a chamber, one end of which having a contacting portion. The first connection element is disposed in the chamber. The first connection element include a driven portion and a first connection end. A ring buckle is connected to the first connection element. The rotation controller contacts the outer surface of the first connection element. The rotation controller includes at least a rotation direction driving portion and an activation switch. The rotation direction driving portion sets the direction of rotation and contacts the transmission disc. The activation switch can change and activate the direction of rotation, thereby making at least a rotation direction driving portion to contact the transmission disc. The second connection element includes a driving piece connected to and driven by the driven portion of the first connection element. The transmission disc is disposed in the chamber and harnessed on the driven portion of the first connection element. The transmission disc forms an inclined angle relative to the contacting portion. One end surface of the transmission disc contacts one of the rotation direction driving portions of the rotation controller.

DETAILED DESCRIPTION OF THE INVENTION

Figure 1:
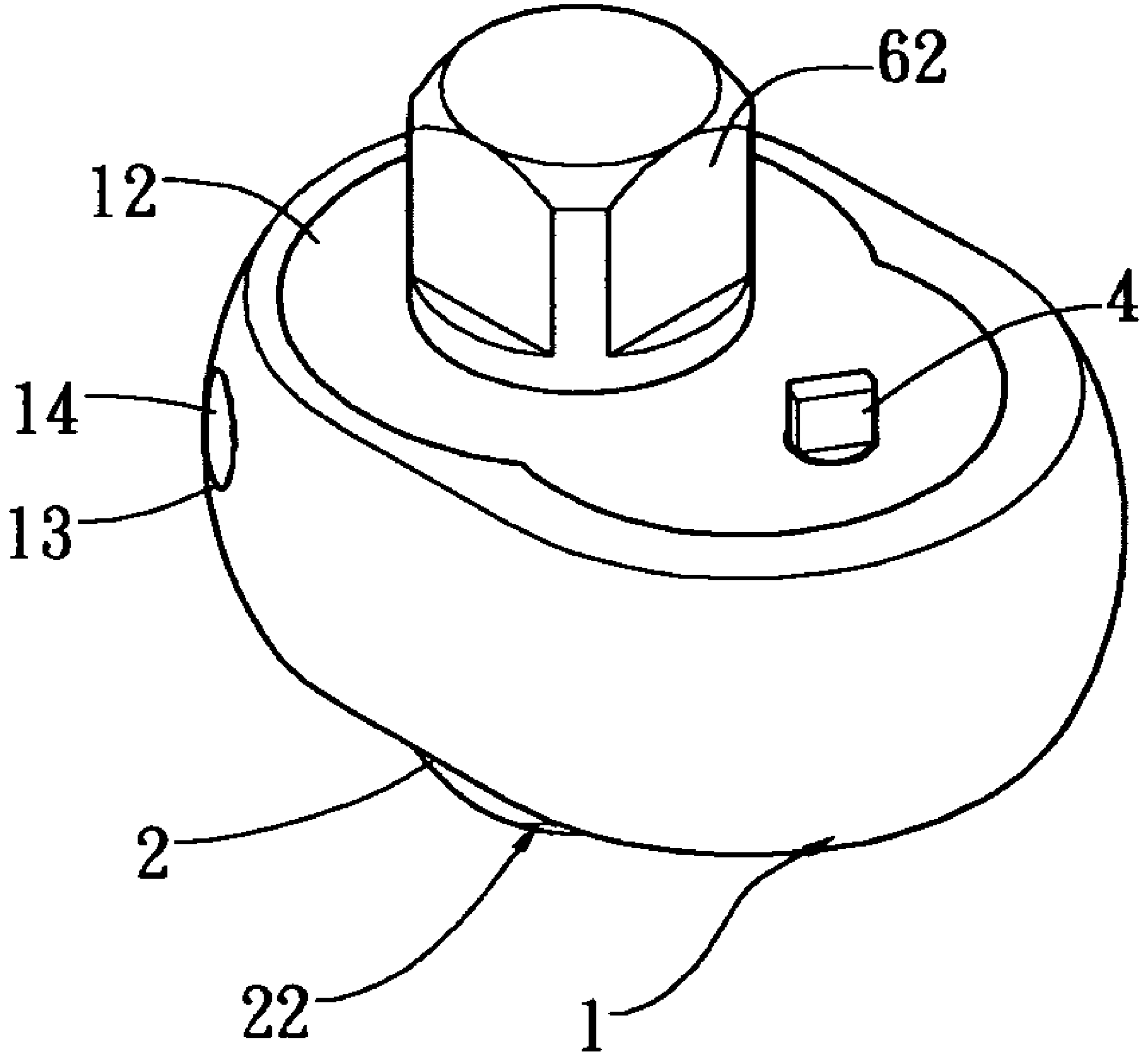
FIG. 1 is a perspective view of a continuously adjustable rotation device, in accordance with one embodiment of the present invention.

In order to better understanding the features and technical contents of the present invention, the present invention is hereinafter described in detail by incorporating with the accompanying drawings. However, the accompanying drawings are only for the convenience of illustration and description, no limitation is intended thereto.

Referring to FIG. 1 to FIG. 7, a continuously adjustable rotation device of the present invention is illustrated. As shown, the continuously adjustable rotation device of the present invention includes a base 1, and a first connection element 2 connected with the base, a ring buckle 20, a transmission disc 5, a second connection element 6, and a rotation controller 3. The assembly of the aforementioned elements form a continuously adjustable rotation device of the present invention, which does not require any alignment process for the slanted surfaces, and is advantageous in its high yield and its low cost.

The base 1 includes a chamber 11 enclosed by a cover 12. The base 1 includes a hole 13 formed on the wall of the base 1. A rod is disposed in the hole 13, forming a protrusive contacting portion 14. The base 1 is one part of, or can be connected with, the structural body of all types of rotational operable product.

The rod can be a cylindrical rod, or a cylindrical rod having an axial directional flat surface. One of the flat surface or the slanted surface contacts the transmission disc to form a inclined arrangement.

The first connection element 2 includes a driven portion 21 and a first connection end. The driven portion 21 includes a connection trench 23 vertically formed thereon for combining with the ring buckle 20, the transmission disc 5, and the second connection element 6, so as to simultaneously rotate along the driven direction.

The ring buckle 20 includes at least a protrusive piece 24 formed in the inner side of the ring buckle 20. The protrusive piece 24 is harnessed on the driven portion 21 and the connection trench 23, thereby combining the ring buckle 20 with the first connection element 2 and supporting the rotational controller 3 for changing the rotational direction. The ring buckle 20 can further be integrated between the driven portion 21 of the first connection element 2 and the first connection end 22.

The rotation controller 3 is disposed around the edge of the driven portion 21, which is composed of a first rotation direction driving portion 31, a second rotation direction driven portion 32 and an activation switch 4. The first rotation direction driven portion 31 and the second rotation direction driven portion 32 both include an activation groove 33, 33'. By switching the activation switch 4 between the two activation grooves 33, 33', one can select the rotation direction. One of the rotation direction driven portion 31, 32 is switched to contact the transmission disc 5 and the second connection element, thereby specifying the direction of rotation.

Figure 2:
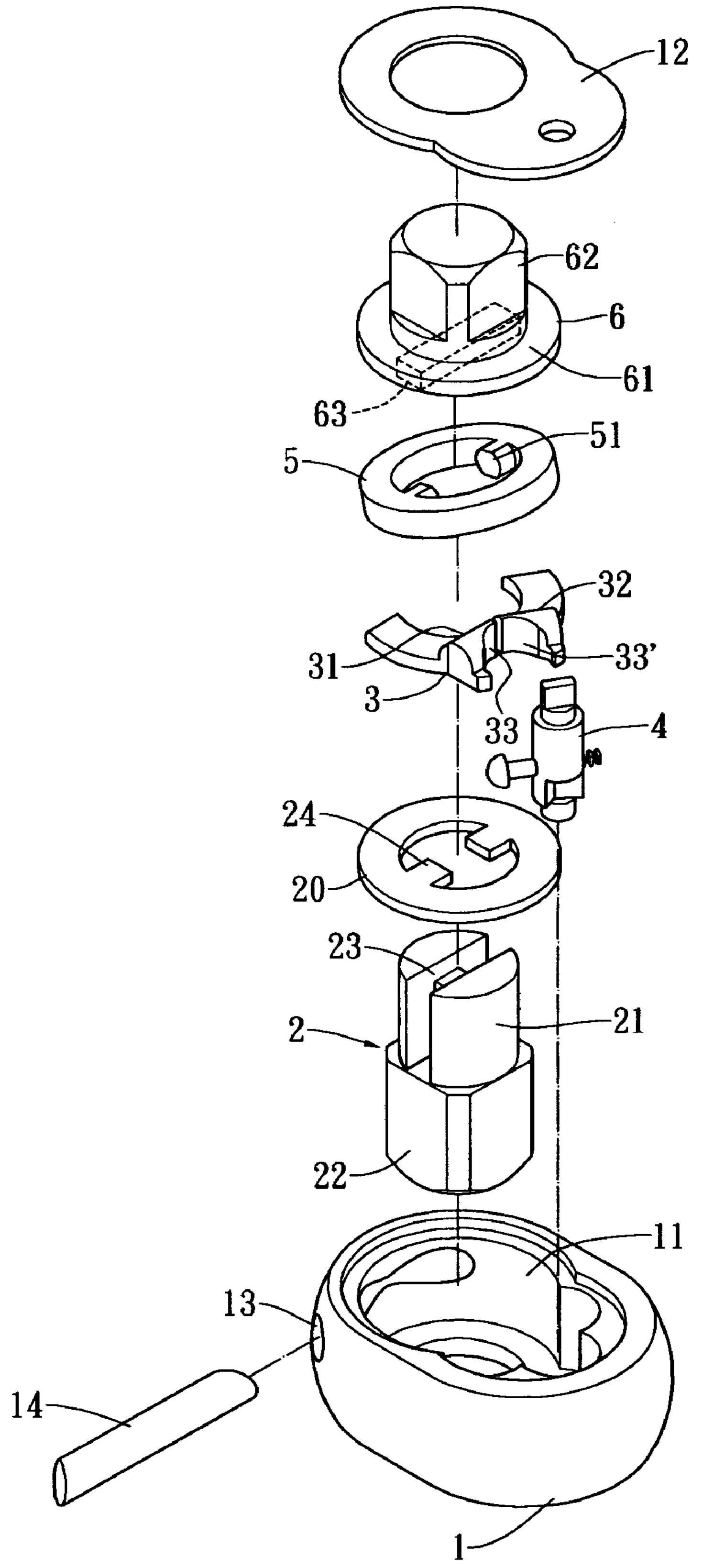
FIG. 2 is an explosive view of the continuously adjustable rotation device, in accordance with one embodiment of the present invention.

The first rotation direction driven portion 31 and the second rotation direction portion 32 can be manufactured independently, as shown in FIG. 2, or manufactured together. Of course, one of the first rotation direction driven portion 31 and the second rotation direction driven portion 32 can be designed to constantly contact the transmission disc 5.

Figure 7:
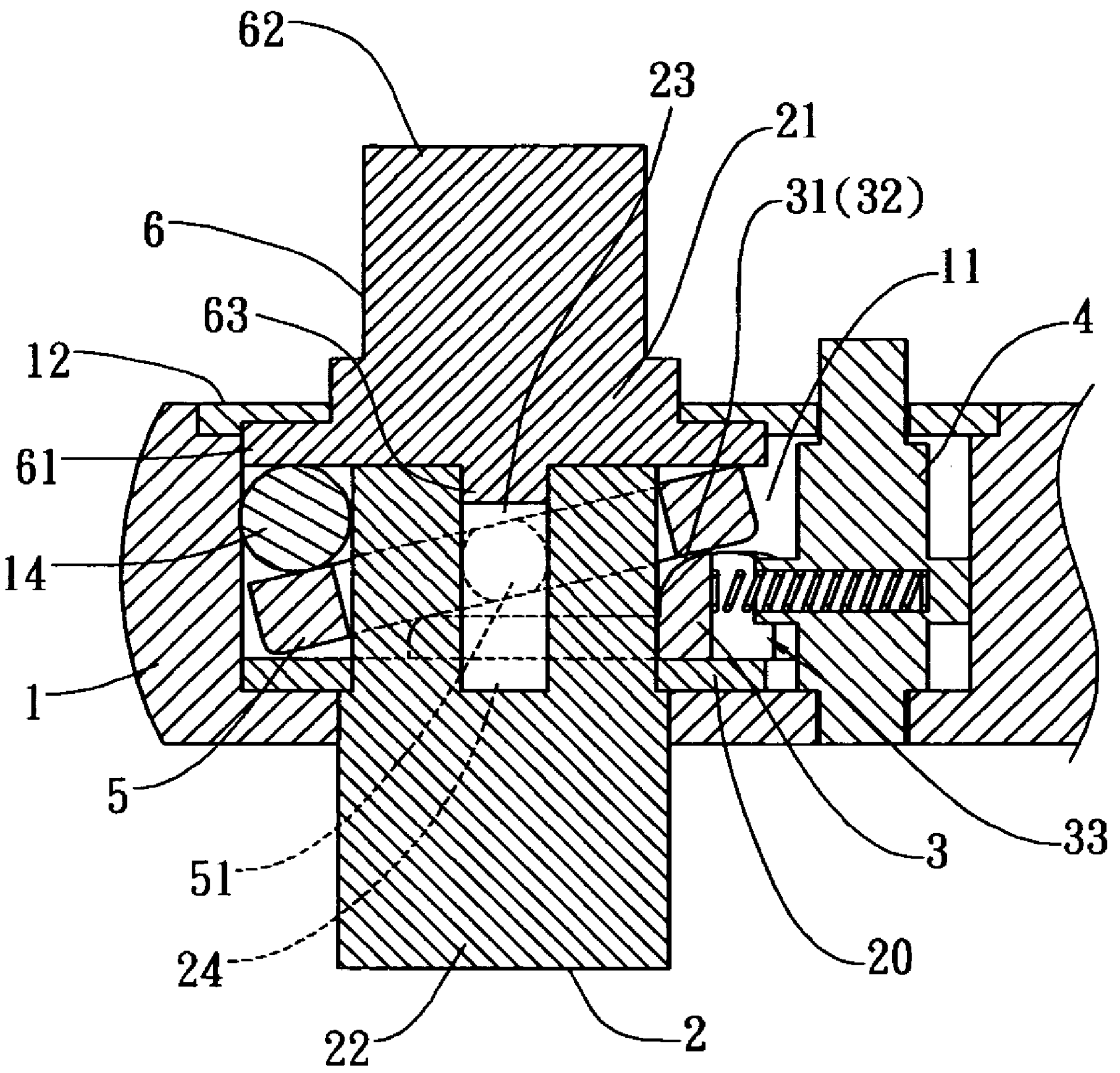
FIG. 7 is a sectional view of the continuously adjustable rotation device, in accordance with one embodiment of the present invention.

A block piece 51 is formed and extended inward from the edge of the transmission disc 5 for harnessing the transmission disc 5 onto the driven portion 21 and the connection trench 23. The ring buckle 20 is then connected to the first connection element 2. Meanwhile, one end of the transmission disc 5 contacts the contacting portion 14 of the base 1 and the second connection element 6, such that no alignment is required when assembling the rotation device. In addition, the contacting portion 15 can also incline the transmission disc 5 to form an angle, thereby allowing the transmission disc 5 and the rotation controller 3 to contact and drive one of the two rotation direction driven portions 31, 32, as shown in FIG. 7. The selection of rotational direction and the driving relation are thus formed. In this manner, no alignment is needed when assembling the rotation device, which can significantly increase the yield and lower the manufacturing cost.

The second connection element 6 includes a circular base 61 and a second connection portion 62 that can be extended outside of the cover 12. One end surface of the circular base 61 contacts the slanted transmission disc 5 and the contacting portion 14. In addition, a driving piece 63 is formed on the circular base 61, so as to connect with the first connection element 2 when assembled in the connection trench 23.

Figure 3:
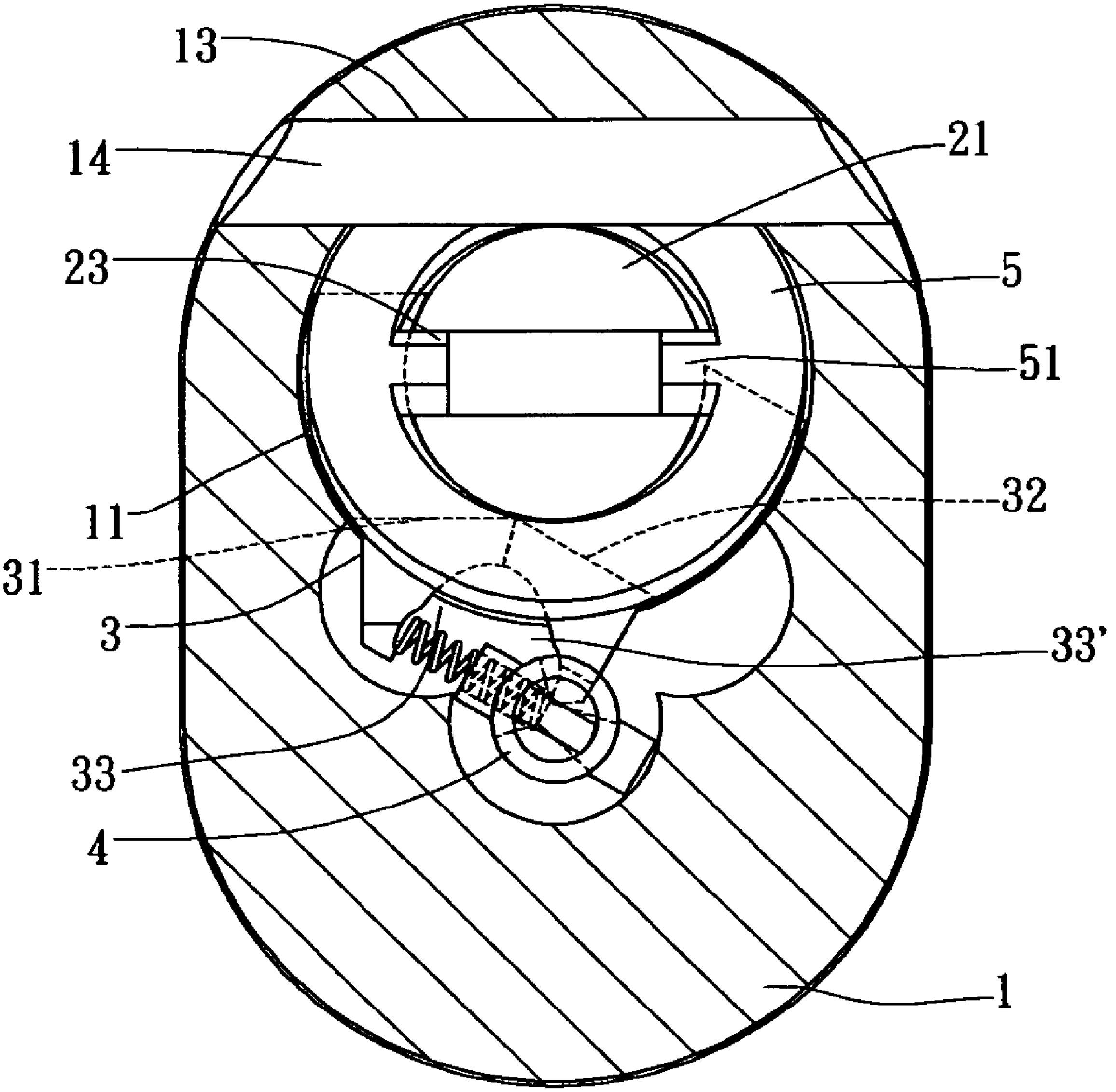
FIG. 3 illustrates the operational relation of the continuously adjustable rotation device being rotated along the first rotational direction, in accordance with one embodiment of the present invention.
Figure 4:
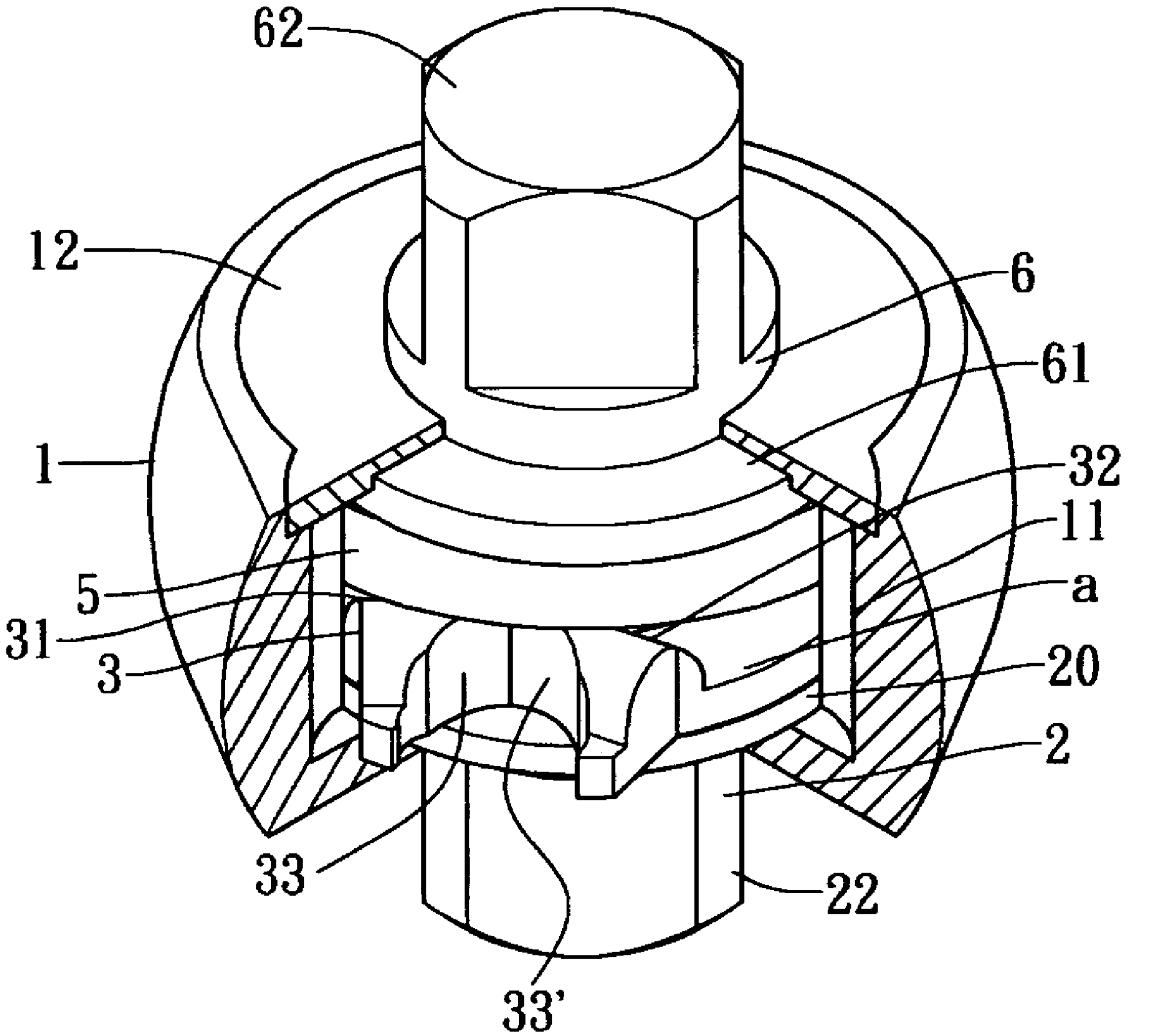
FIG. 4 illustrates the structural relation of the continuously adjustable rotation device being rotated along the first rotational direction, in accordance with one embodiment of the present invention.

Referring to FIG. 3 to FIG. 6, the operation of the continuously adjustable rotation device of the present invention is illustrated. As shown in FIG. 3, the first rotation direction driving portion 31 of the rotation controller 3 contacts the slanted transmission disc 5, when the activation switch 4 is set to the first rotation direction and locked in the activation groove 33 of the first rotation direction driving portion 31. Meanwhile, as shown in FIG. 4, the second rotation direction driving portion 32 does not contact the transmission disc 5. In addition, the transmission disc 5 still contacts the contacting portion 14, the end surface of the circular base 61 of the second connection element 6. When rotating the rotation device of the present invention along the first rotation direction, the second connection element 6, the first rotation direction driving portion 31 and the transmission disc 5 will rotate simultaneously. At the same time, the combination of the driving piece 63 of the second connection element, the block piece 51 of the transmission disc 5 and the driven portion of the first connection element 2 will drive the second connection element 2 to rotate along the same direction simultaneously.

Figure 5:
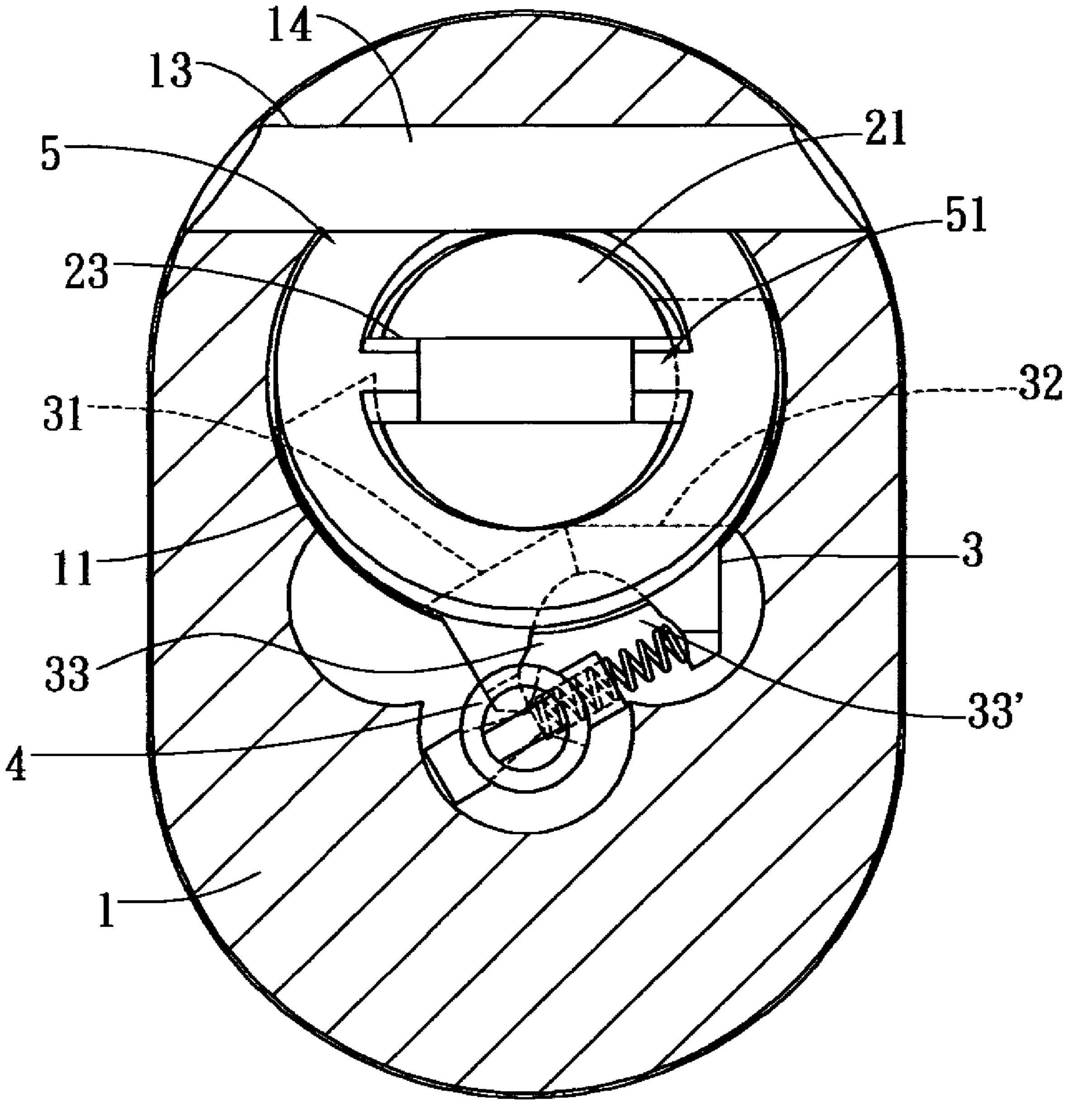
FIG. 5 illustrates the operational relation of the continuously adjustable rotation device being rotated along the second rotational direction, in accordance with one embodiment of the present invention.
Figure 6:
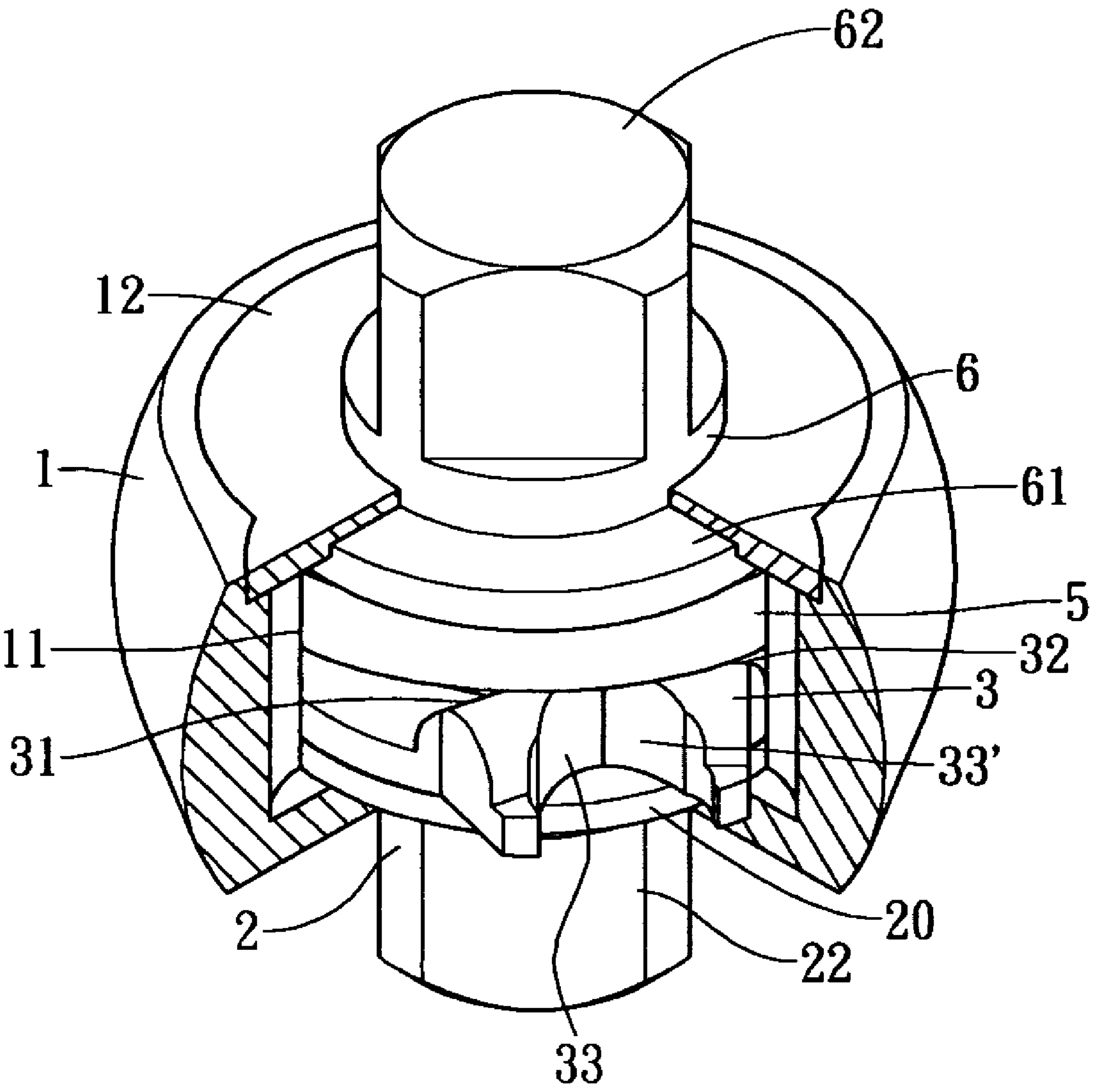
FIG. 6 illustrates the structural relation of the continuously adjustable rotation device being rotated along the second rotational direction, in accordance with one embodiment of the present invention.

As shown in FIG. 5, when the activation switch 4 is turned to the second rotation direction, and locked in the activation groove 33' of the second rotation direction driving portion 32, the rotation controller 3 will be set to the second rotation direction driving portion 32, contacting the slanted transmission disc 5. Meanwhile, the first rotation direction driving portion 31 does not contact the transmission disc 5, as shown in FIG. 6. In this manner, the rotational operation along the second rotation direction will enable the second connection element 6 to rotate along the second rotation direction simultaneously with the transmission disc 5 and the first connection element 2.

Figure 8:
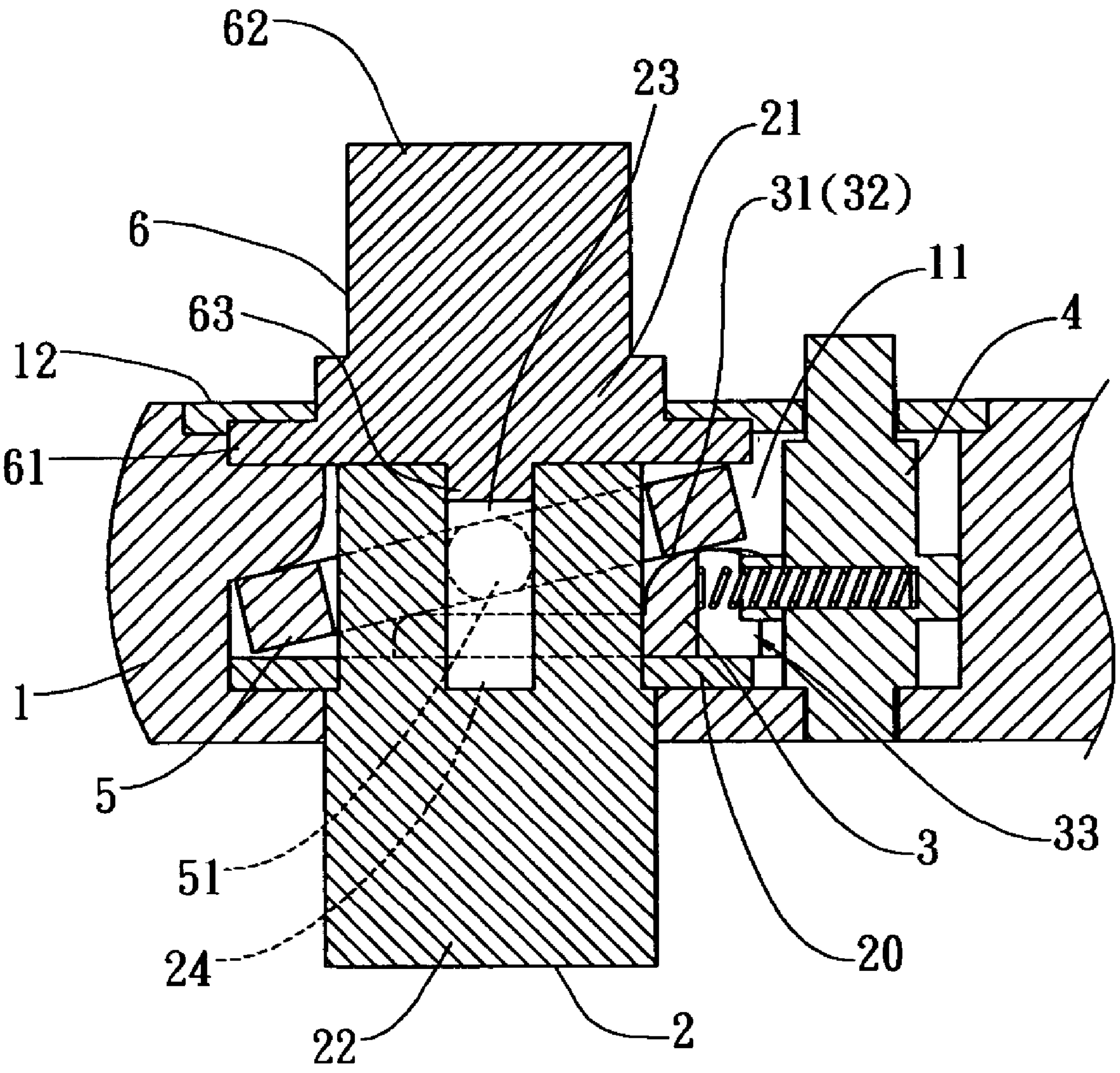
FIG. 8 is a sectional view of the continuously adjustable rotation device, in accordance with another embodiment of the present invention.

Referring to FIG. 8, a continuously adjustable rotation device in accordance with another embodiment of the present invention is illustrated. As shown, this particular embodiment is similar to that shown in FIG. 1 to FIG. 7. However, the difference is in that the contacting portion 14 is integrated with the protrusive portion on the inner surface of the chamber of the base 1. The contacting portion 14 in this particular embodiment includes at least a flat surface, which contacts the transmission disc 5 and the second connection element 6, thereby allowing the transmission disc 5 to form a fixed slanted angle. The transmission disc 5 can thus be operated with the rotation controller 3.

Figure 9:
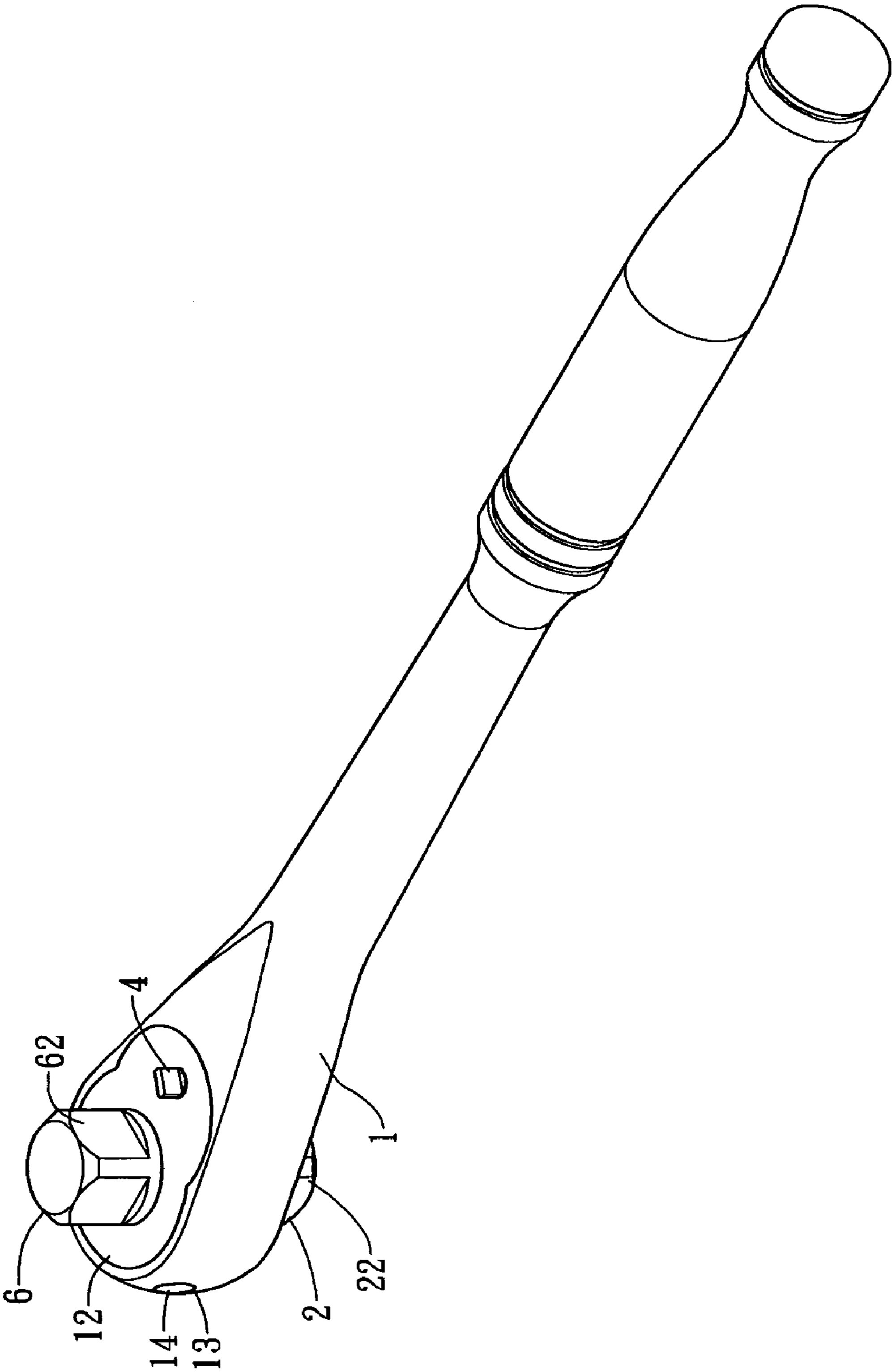
FIG. 9 illustrates the continuously adjustable rotation device of the present invention used in a wrench.
Figure 10:
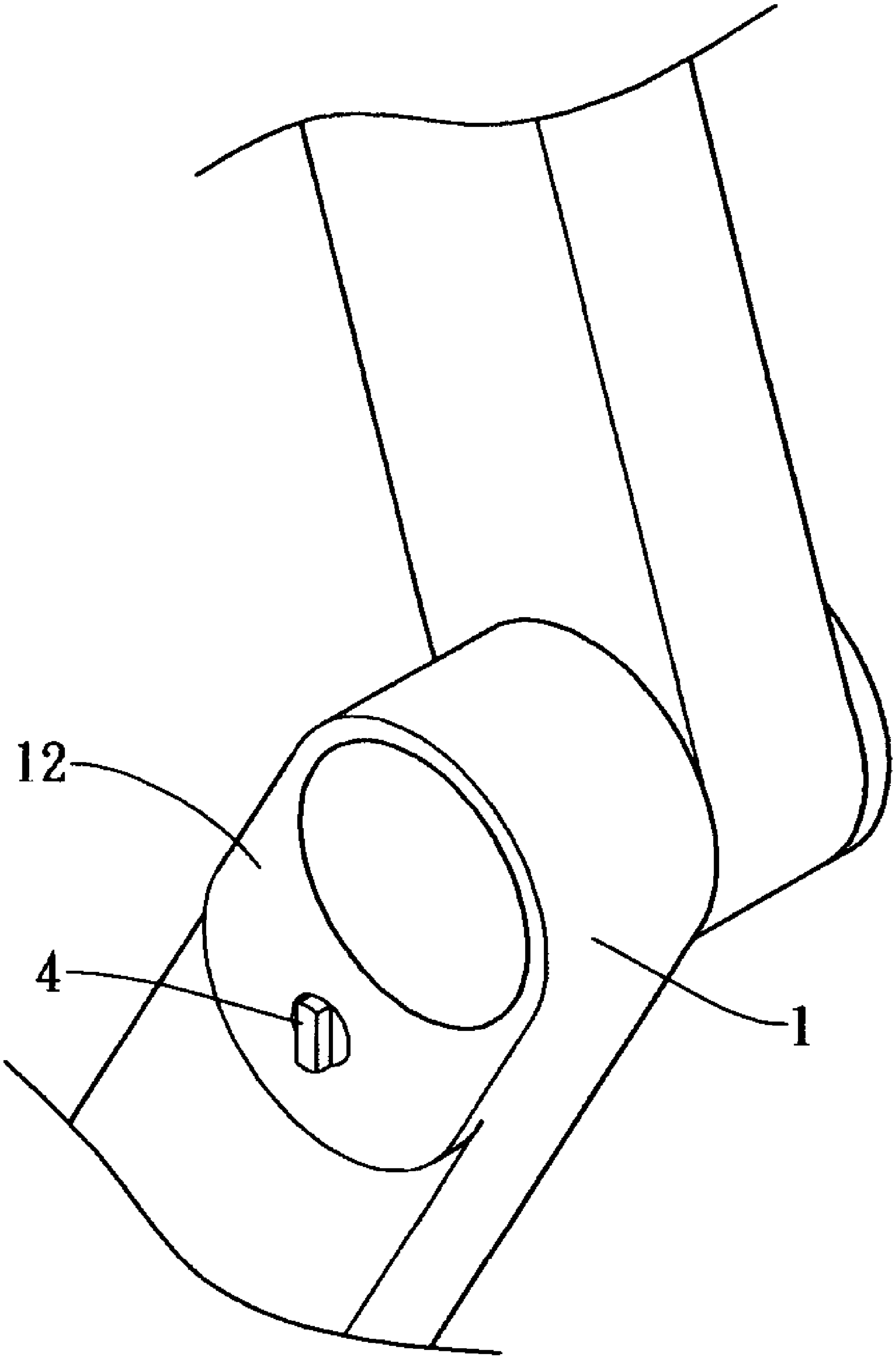
FIG. 10 illustrates the continuously adjustable rotation device of the present invention used in a rotation shaft of an adjustable lamp rod.
Figure 11:
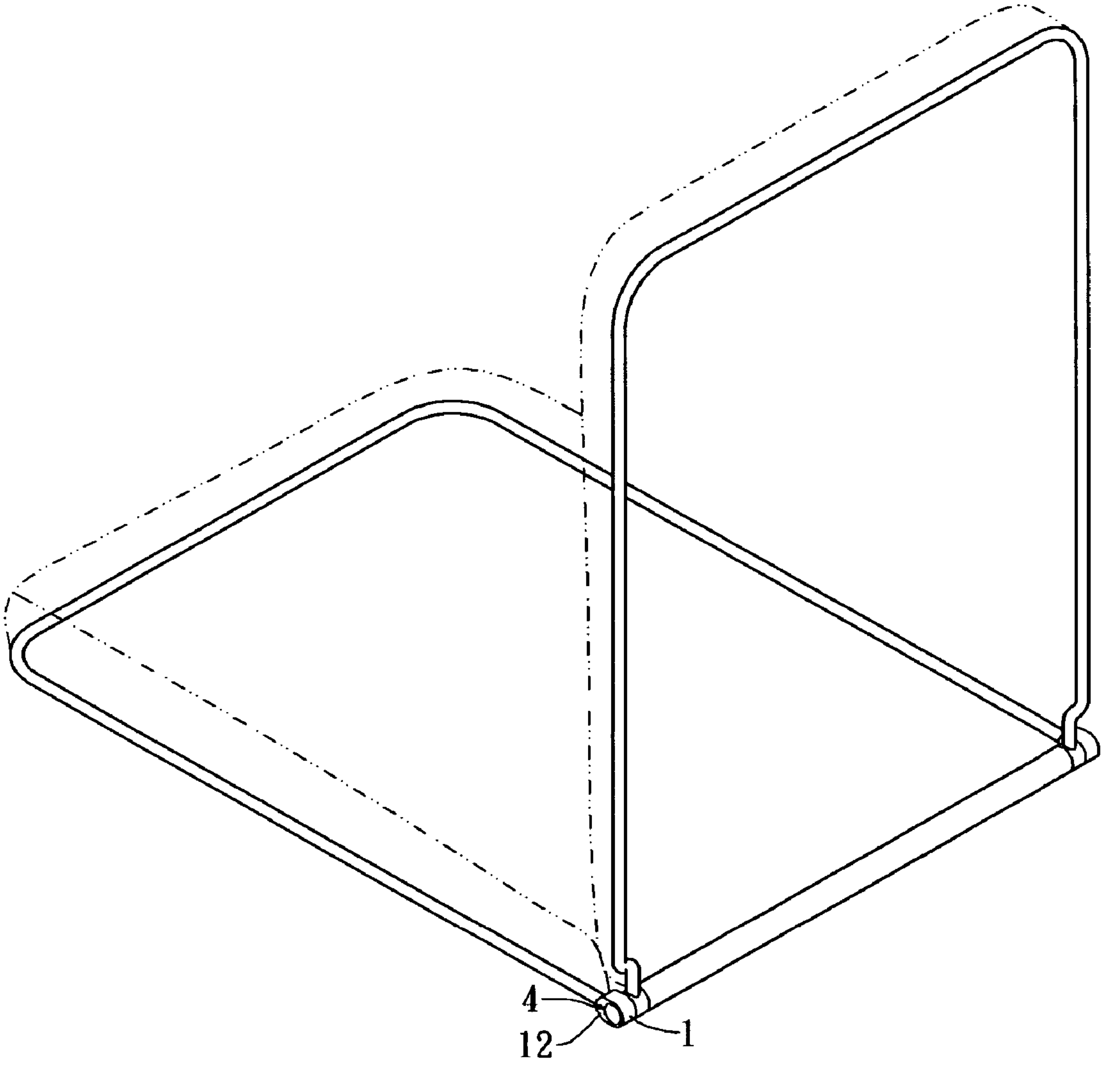
FIG. 11 illustrates the continuously adjustable rotation device of the present invention used in a rotation shaft between a seat and a seat back.
Figure 12:
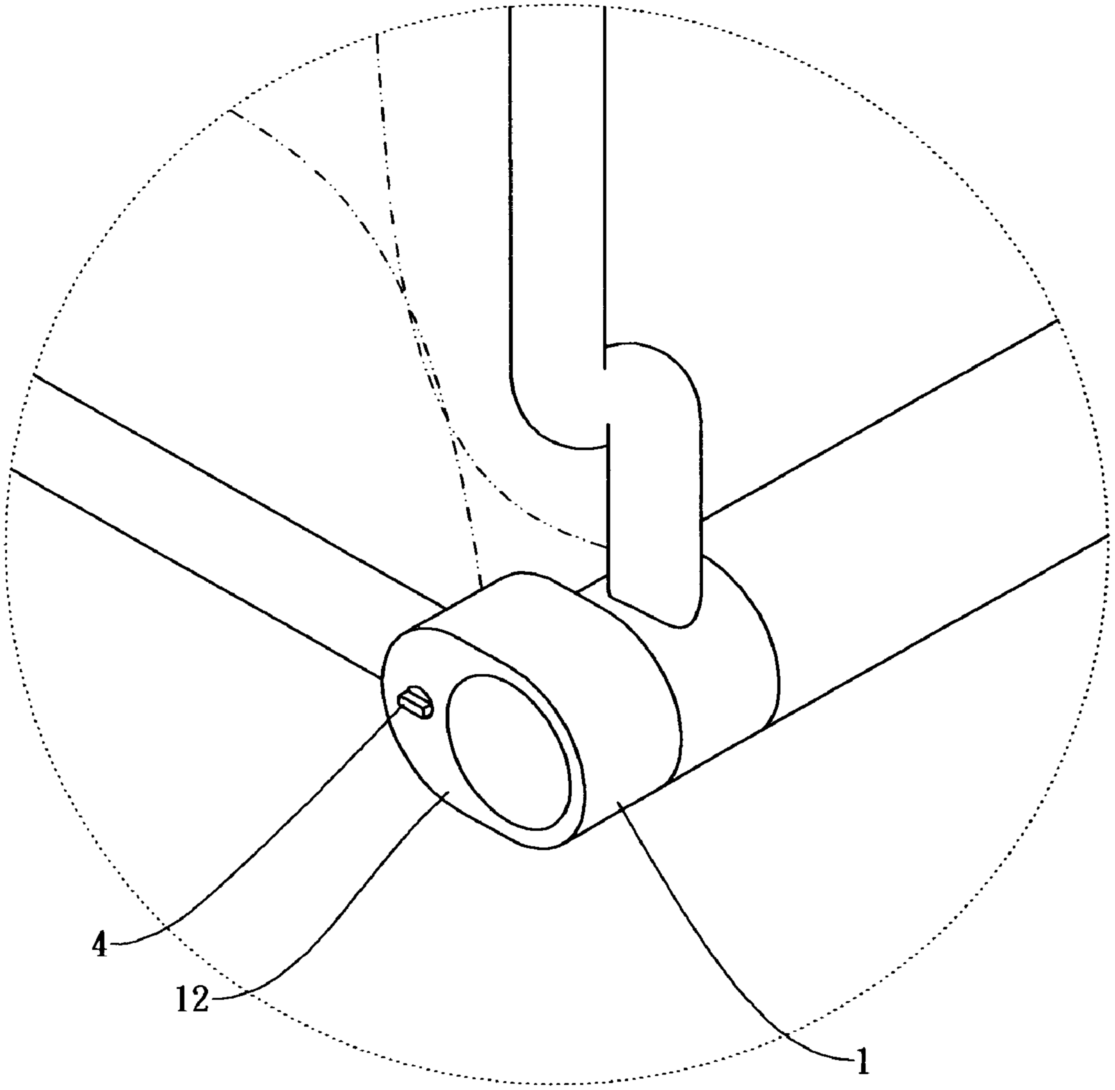
FIG. 12 is a partially enlarged view illustrating the continuously adjustable rotation device of the present invention used in a rotation shaft between a seat and a seat back.

The continuously adjustable rotation device of the present invention is applicable to a wrench, as shown in FIG. 9, or to the rotation shaft of an adjustable lamp rod, as shown in FIG. 10. In addition, the continuously adjustable rotation device of the present invention is also applicable to the rotation shaft between a seat and a seat back, as shown in FIG. 11 and FIG. 12. The first connection end 22 of the first connection element 2 and the second connection portion 62 of the second connection element 6 (or the first connection element 2 and the second connection element 6) can be connected to a fixed end and a mobile end of the aforementioned products, such that a continuously adjustable rotation operation can be performed by driving the driving piece 63 of the second connection element 6 and the block piece 51 of the transmission disc 5, and the first connection element 2 relative to the driven portion 21 along the rotation direction selected by the rotation controller 6 via the mutually contacted the second connection element 6, the transmission disc 5 and the contacting portion 14.

Figure 13:
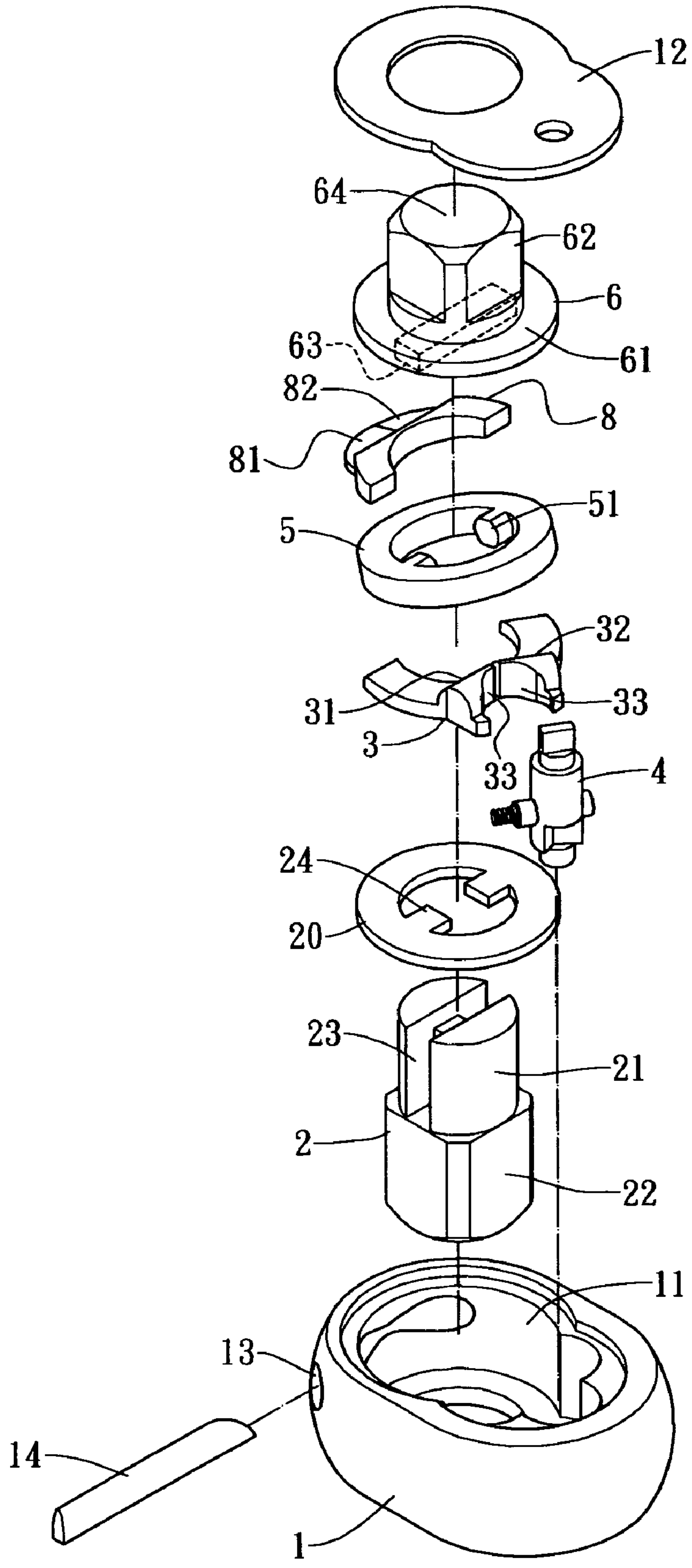
FIG. 13 is an explosive view of the continuously adjustable rotation device, in accordance with yet another embodiment of the present invention.
Figure 14:
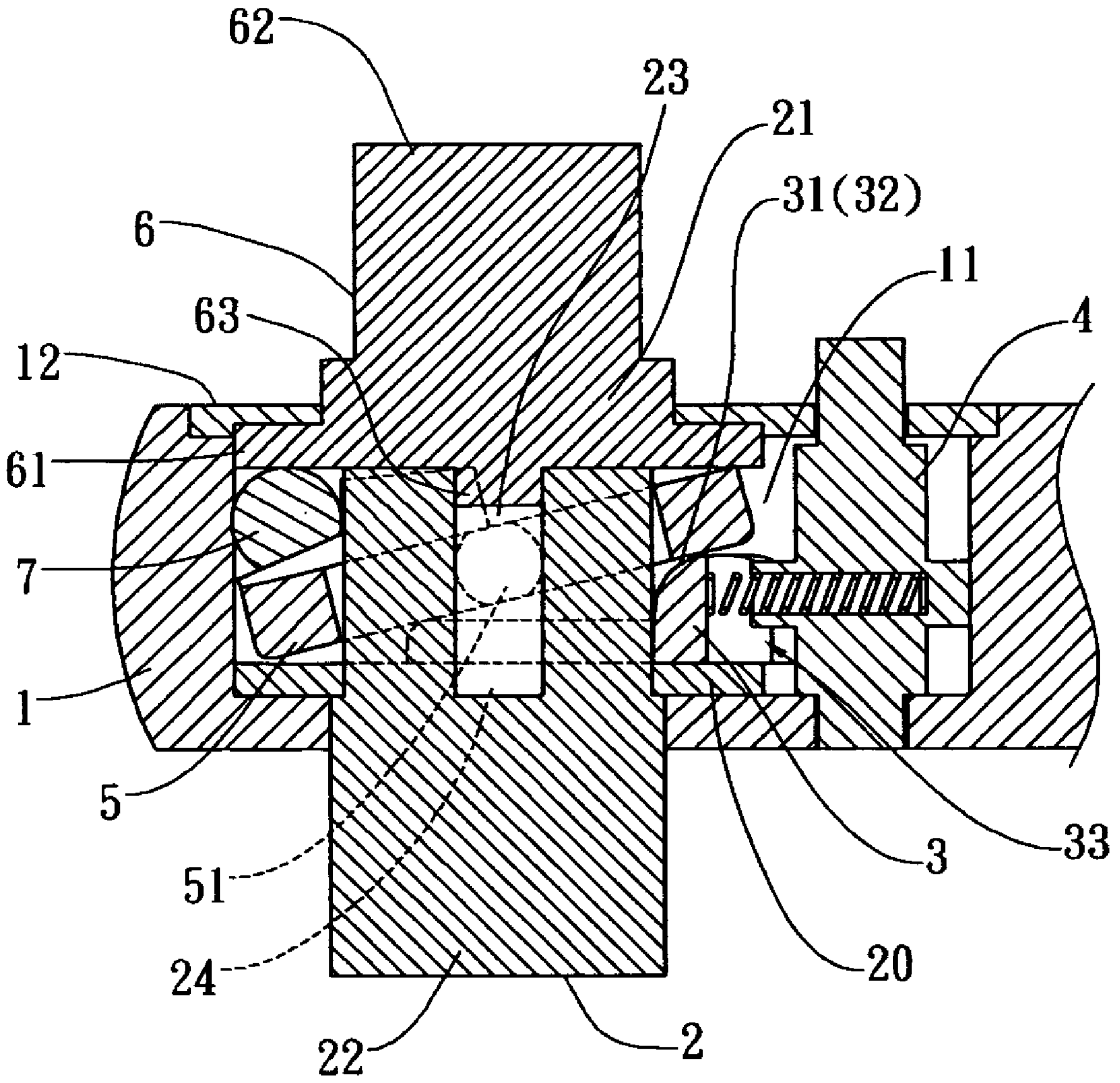
FIG. 14 is a sectional view of the continuously adjustable rotation device, in accordance with yet another embodiment of the present invention.

Referring again to FIG. 13 and FIG. 14, a continuously adjustable rotation device in accordance with yet another embodiment of the present invention is illustrated. As shown, this particular embodiment is similar to that shown in FIG. 1 and FIG. 2. The difference is in that a pad 8 is further disposed between the transmission disc 5 and the contacting portion 14. The pad 8 is disposed on the transmission disc 5, and includes two slanted surfaces 81, 82 with two opposite inclination angles. Alternatively, the pad 8 can has only one slanted surface contacting the flat surface of the contacting portion 14. In this manner, the angle of the contacting portion 14 becomes larger. As a result, a larger release space is obtained. Therefore, only a small movement will release the contact between the slanted surfaces 81, 82 and the contacting portion 14.

Since, any person having ordinary skill in the art may readily find various equivalent alterations or modifications in light of the features as disclosed above, it is appreciated that the scope of the present invention is defined in the following claims. Therefore, all such equivalent alterations or modifications without departing from the subject matter as set forth in the following claims is considered within the spirit and scope of the present invention.

What is claimed is:

1. A continuously adjustable rotation device, comprising:

a base including a chamber, one end of the chamber includes a contacting portion;

a first connection element disposed in the chamber, the first connection element including a ring buckle connected between a driven portion and a first connection end;

a rotation controller situated in the chamber and disposed above the ring buckle contacting the driven portion of the first connection element, the rotation controller including one or more rotation direction driving portions; and a transmission disc disposed in the chamber and harnessed on the driven portion of the first connection element, which forms an inclined angle relative to the contacting portion, one end surface of the transmission disc contacting one of the rotation direction driving portions of the rotation controller, wherein the base comprises a hole penetrating the chamber, the hole having a cylindrical rod disposed therein for forming the contacting portion and making the transmission disc to form the inclined angle, and wherein the cylindrical rod comprises an axial directional flat surface for contacting the transmission disc and forming the inclined angle.

2. The rotation device as recited in claim 1, wherein the ring buckle is integrated with the driven portion of the first connection element and the first connection end, the driving portion further comprising a connection trench; and the ring buckle further comprises a protrusive piece, the transmission disc comprises a block piece, and the second connection element comprises a driving piece, the protrusive piece, the block piece, and the driving piece being retained in the connection trench of the driven portion.

3. The rotation device as recited in claim 1, wherein the ring buckle is harnessed to the driven portion of the first connection element, the driven portion having a connection trench formed thereon; and the ring buckle further comprises a protrusive piece, the transmission disc comprises a block piece, and the second connection element comprises driving piece, the protrusive piece, the block piece, and the driving piece being retained in the connection trench of the driven portion.

4. The rotation device as recited in claim 1, wherein the ring buckle is integrated between the driven portion of the second connection element and the first connection end.

5. The rotation device as recited in claim 1, wherein the rotation controller further comprises:

a first rotation direction driving portion for selecting a first rotation direction, one end of which having an activating portion formed thereon;

a second rotation direction driving portion for selecting a second rotation direction, one end of which having an activating portion formed thereon;

an activation switch formed relative to the activation portion of the first rotation direction driving portion and the second rotation direction driving portion for switching the direction of rotation.

6. The rotation device as recited in claim 5, wherein the first rotation direction driving portion and the second rotation direction driving portion are manufactured independently or integrated together.

7. The rotation device as recited in claim 1, wherein the rotation controller further comprises a rotation driving portion contacting the transmission disc, thereby performing a single directional rotational operation.

8. The rotation device as recited in claim 1, further comprising a second connection element disposed in the chamber relative to the driven portion of the first connection element.

9. A continuously adjustable rotation device, comprising:

a base including a chamber, one end the chamber includes a contacting portion;

a first connection element disposed in the chamber, the first connection element including a ring buckle connected between a driven portion and a first connection end;

a pad contained in the chamber, which is disposed above a transmission disc and includes at least a slanted surface for contacting the contacting portion;

a rotation controller situated in the chamber and disposed above the ring buckle contacting the driven portion of the first connection element, the rotation controller including one or more rotation direction driving portions;

the transmission disc disposed in the chamber and harnessed on the driven portion of the first connection element, which forms an inclined angle relative to the contacting portion, one end surface of the transmission disc contacting one of the rotation direction driving portions of the rotation controller.

10. The rotation device as recited in claim 9, wherein the pad includes two slanted surface with two opposite inclination angles.

11. The rotation device as recited in claim 9, further comprising a second connection element disposed in the chamber relative to the driven portion of the first connection element.

12. A continuously adjustable rotation device, comprising:

a base including a chamber, one end of the chamber includes a contacting portion;

a first connection element disposed in the chamber, the first connection element including a ring buckle connected between a driven portion and a first connection end;

a rotation controller situated in the chamber and disposed above the ring buckle contacting to driven portion of the first connection element, the rotation controller including one or more rotation direction driving portions; and a transmission disc disposed in the chamber and harnessed on the driven portion of the first connection element, which forms an inclined angle relative to the contacting portion, one end surface of the transmission disc contacting one of the rotation direction driving portions of the rotation controller, wherein the ring buckle is harnessed to the driven portion of the first connection element, or the ring buckle is integrated with the driven portion of the first connection element and the first connection end, the driven portion having a connection trench formed thereon; and the ring buckle further comprises a protrusive piece, the transmission disc comprises a block piece, and a second connection element comprises a driving piece, the protrusive piece, the block piece, and the driving piece being retained in the connection trench of the driven portion.

13. The rotation device as recited in claim 12, wherein the rotation controller further comprises:

a first rotation direction driving portion for selecting a first rotation direction, one end of which having an activating portion formed thereon;

a second rotation direction driving portion for selecting a second rotation direction, one end of which having an activating portion formed thereon;

an activation switch formed relative to the activation portion of the first rotation direction driving portion and the second rotation direction driving portion for switching the direction of rotation.

14. The rotation device as recited in claim 13, wherein the first rotation direction driving portion and the second rotation direction driving portion are manufactured independently or integrated together.

15. The rotation device as recited in claim 12, wherein the rotation controller further comprises a rotation driving portion contacting the transmission disc, thereby performing a single directional rotational operation.

16. The rotation device as recited in claim 12, wherein the contacting portion is directly formed in the chamber of the base for contacting the transmission disc for forming the inclined angle.

17. The rotation device as recited in claim 16, wherein the contacting portion comprises a slanted surface for contacting the transmission disc.

18. The rotation device as recited in claim 12, further comprising a second connection element disposed in the chamber relative to the driven portion of the first connection element.

* * * * *